United States Patent Office 3,382,154
Patented May 7, 1968

3,382,154
THERMIONIC ENERGY CONVERTER
Kurt Stahl, Hohensachsen an der Bergstrasse, Herbert Winkenbach, Leimen, near Heidelberg, Alfred Jester, Speyer (Rhine), and Reinhard Langpape, Mannheim, Germany, assignors to Brown, Boveri & Cie Aktiengesellschaft, Mannheim-Kafertal, Germany, a corporation of Germany
Filed July 6, 1965, Ser. No. 469,759
Claims priority, application Germany, July 3, 1964, B 77,515
11 Claims. (Cl. 176—73)

ABSTRACT OF THE DISCLOSURE

An emitter for thermionic energy conversion which includes an emitter body of electrically conducting material, nuclear fuel material in thermal contact with the emitter body, the ratio of the emitter surface (S) in cm.$^2$ to the fuel quantity (Q) in cm.$^3$ being not larger than $S/Q=0.8E$, wherein E denotes the enrichment of the fuel material in percent.

---

Our invention relates to thermionic energy converters and more particularly to devices for converting nuclear energy into electricity.

Metals emit electrons when heated to a temperature above 1000° C. This effect has been utilized in thermionic energy converters for translating heat from atomic nuclear processes directly into electrical energy. Such an energy converter is composed of individual elements of which each is equipped with a heated, electron-emitting cathode, called emitter, and an anode which absorbs the electrons.

For economical operation, a thermionic element must satisfy various requirements. In the first place, the surface of the emitter must be heated to a temperature of approximately 2000° K., and the minimum density of the thermal energy supplied to its surface must be 50 watt/cm.$^2$. To keep the electrical resistance in the emitter sufficiently small, in other words to have a conducting cross section of sufficiently large size, the emitter must be given a relatively large wall thickness (about 2 to 3 mm.) in comparison with the normal envelopes of nuclear fuel bodies which do not serve to convert thermionic energy and whose wall thickness is about 0.1 mm. Also to be taken into account is the fact that a thermionic element of 7 mm. diameter is almost as expensive to produce as a similar element of 14 mm. diameter but furnishes only one-half the power output of the thicker element. For that reason, the diameter of a thermionic element should not be smaller than about 10 mm.

In the known thermionic elements, the nuclear fuel material forms a massive core which fills an emitter of cylindrical shape. With such a thermionic element, the above-mentioned requirements cannot be met simultaneously. This is because there are only two possibilities. One of these is to give the emitter and consequently the fuel core a large diameter, in which case the energy density at the emitter surface can be chosen correspondingly high, and the wall thickness of the emitter can be made sufficiently large for low electrical resistance. However, since the thermal conductivity of the fuel is relatively slight, a sufficiently high temperature (about 2000° K.) of the emitter surface is not attained in this manner. The second possibility is to give the emitter and the fuel core a small diameter, but since the diameter of the thermionic element must not be smaller than about 10 mm., such an element, as explained above, operates uneconomically. Furthermore, the ratio of the emitter surface to the heat-issuing surface of the fuel is relatively large because the emitter must have a given wall thickness. This results in a high energy density in the fuel, which corresponds to a large neutron flux and causes excessive burn-off and consequently an unsatisfactorily short lifetime.

It is an object of our invention to avoid these disadvantages of thermionic energy converters in which thermal energy is produced by a nuclear process and is supplied to an electrically conducting body heat-conductively connected with the nuclear fuel and serving as emitter for the electrons.

We have discovered that in such a converter the above-mentioned desired qualities are attained and the disadvantages avoided if the ratio of the emitter surface (S) in cm.$^2$ to the nuclear fuel quantity (Q) in cm.$^3$ is not larger than $S/Q=0.8E$, wherein E denotes the enrichment of the fuel material in percent.

Conventional nuclear fuel materials and emitter materials are applicable. Used as fuel material, for example, is uranium or uranium carbide enriched by U235 or U238 and thorium. While in power reactors the fissionable content of the fuel, as a rule is 3 to 7% by weight (POWER, March 1965, page 5 of the report by R. K. Evans on Nuclear Power Reactors), it is preferable to use for the purposes of the invention a minimal fuel enrichment of about 10%, up to 90% or more. Applicable as emitter materials are refractory metals such as molybdenum and tungsten.

More specifically, we have found that the desired operational quality is secured if the quantity of the nuclear fuel in cm.$^3$ to the surface of the emitter in cm.$^2$ has at least the ratio 1:8 at 10% enrichment
1:40 at 50% enrichment
1:72 at 90% enrichment According to another feature of our invention, the emitter is a full cylinder or thick-walled cylinder with bores parallel to its longitudinal axis, and the fuel material is used in form of rods which are inserted into the respective bores and have a diameter not larger than 0.69 cm. at 10% enrichment
0.3 cm. at 50% enrichment
3.23 cm. at 90% enrichment It will be understood that at the other values with respect to diameter or enrichment the limit conditions should be analogous to those stated, that is, should be in accordance with the corresponding interpolations. This also applies to the other data given in this specification.

According to another feature of our invention, the nuclear fuel material is provided in form of tablets or pellets, and these are embedded in the emitter, the thickness of the tablet being not larger than 0.49 cm. at 10% enrichment
0.22 cm. at 50% enrichment
0.16 cm. at 90% enrichment According to a further feature of the invention the nuclear fuel may be placed in form of a layer of uniform thickness on one side of the emitter, this layer having a thickness of no more than 0.25 cm. at 10% enrichment
0.11 cm. at 50% enrichment
0.08 cm. at 90% enrichment The general dimensioning requirements mentioned in the foregoing with respect to the described configurations of emitter and nuclear fuel, apply analogously also to the emitter-fuel arrangements according to the invention described in the following.

The nuclear fuel may be inserted as a granular material or in the form of coated particles into bores of the emitter. Furthermore, in order to achieve optimal heat transfer, the nuclear fuel may be mixed homogeneously with the emitter. For this purpose, for example, the emitter may be made of sponge-like material and impregnated with nuclear fuel, or vice versa, depending upon which of the two materials has the higher melting point. Furthermore, it is advantageous to sinter the nuclear fuel into the emitter material, or to conjointly sinter the nuclear fuel and the emitter material.

Another way of joining the nuclear fuel with the emitter material is to use a multiplicity of nuclear-fuel balls or spheres and to arrange them with the tightest possible grouping, which is then filled by casting the emitter material into the interspaces.

The invention will be further described with reference to thermionic converter elements according to the invention illustrated by way of example on the accompanying drawings in which.

Figure 1:
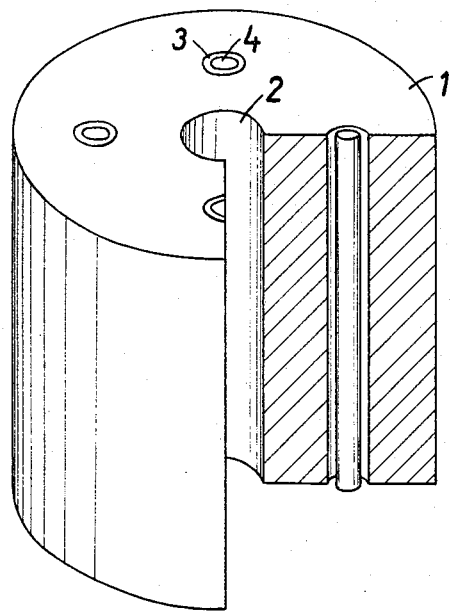
FIG. 1 shows perspectively a cylindrical emitter, partly in section, which is equipped with rod-shaped fuel elements.

The emitter element according to FIG. 1 comprises a thick-walled cylinder 1 which forms the emitter proper. The cylinder is provided with a number of bores 3 extending parallel to the center bore of the structure. The rods 4 of nuclear fuel material are placed into the respective bores.

Figure 2:
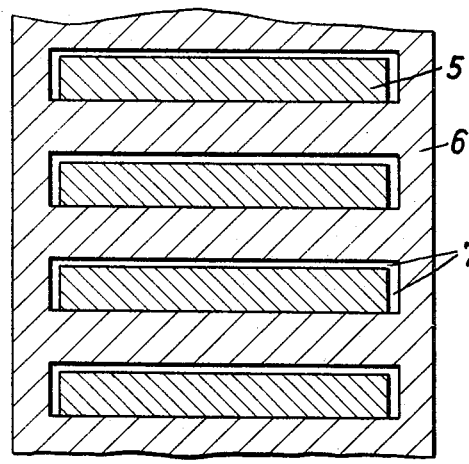
FIG. 2 shows in section an emitter with a plurality of hollow spaces in which the fuel material is located in form of respective tablets.

According to FIG. 2, the nuclear fuel is constituted by disc-shaped circular tablets 5 disposed in respective interior spaces of the emitter structure 6. To permit the fuel tablets 5 to expand when heated, without damaging the emitter structure, the tablet-receiving spaces in the emitter are preferably given a larger height and a larger diameter so as to form interstitial clearance gaps as shown at 7.

Figure 3:
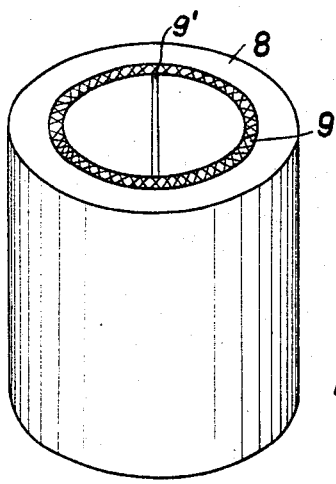
FIG. 3 shows in perspective a hollow cylindrical emitter whose inner surface is coated with a layer of fuel material.

According to FIG. 3, the inner wall of a hollow cylindrical emitter structure 8 is coated by a uniformly thick layer 9 of nuclear fuel material. The coating may have at least one expansion gap 9' parallel to the cylinder axis or generally in the longitudinal direction.

Figure 4:
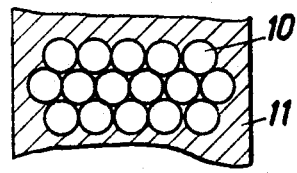
FIG. 4 shows a group of spherical fuel elements embedded in a casting of emitter material.

As mentioned, the nuclear fuel may be given the shape of balls as shown at 10 in FIG. 4, the balls are grouped together in the tightest possible packing and are embedded in a casting 11 of the emitter material which also fills the voids between the fuel balls.

In addition to employing enriched uranium or uranium carbide and thorium as fuel material and molybdenum and tungsten as emitter material, uranium dioxide, uranium bicarbide and uranium nitride can also be used as fuel material and niobium can also be used as emitter material.

We claim:

1. An emitter for thermionic energy conversion, comprising an emitter body of electrically conducting material, nuclear fuel material in thermal contact with said emitter body, the ratio of the emitter surface (S) in cm.$^2$ to the fuel quantity (Q) in cm.$^3$ being not larger than $S/Q=0.8E$, wherein E denotes the enrichment of said fuel material in percent.

2. In an emitter for thermionic energy conversion, according to claim 1, the percentile enrichment value E being at least equal to about 10.

3. In an emitter for thermionic energy conversion according to claim 1, said emitter body being formed of a cylindrical structure having bores parallel to its axis, said nuclear fuel material being formed of rods and disposed in said respective bores, the diameter of said rods being not larger than corresponds to 0.69 cm. at 10% enrichment
0.3 cm. at 50% enrichment
0.23 cm. at 90% enrichment 4. In an emitter for thermionic energy conversion according to claim 1, said nuclear fuel material being formed as tablets inserted into said emitter body and having a thickness not larger than corresponds to 0.49 cm. at 10% enrichment
0.22 cm. at 50% enrichment
0.16 cm. at 90% enrichment 5. In a thermionic energy emitter according to claim 4, said emitter body having cavities in which said respective fuel tablets are located, said cavities being wider and broader than said tablets so as to form interstitial gaps to allow for thermal expansion of said tablets.

6. In an emitter for thermionic energy conversion according to claim 1, said fuel material forming on said emitter body a layer of substantially uniform thickness which is no thicker than corresponds to 0.25 cm. at 10% enrichment
0.11 cm. at 50% enrichment
0.08 cm. at 90% enrichment 7. In a thermionic energy emitter according to claim 6, said emitter body being formed as a hollow cylinder, and said fuel layer forming a coating on the inner surface of said cylinder.

8. In a thermionic energy emitter according to claim 7, said coating of fuel material having at least one expansion gap extending longitudinally of said cylinder.

9. In a thermionic energy emitter according to claim 1, said emitter body having bores, and said fuel material being granular and inserted into said bores.

10. In a thermionic energy emitter according to claim 1, said emitter body having bores, and said fuel material forming coated particles and being inserted into said bores.

11. In a thermionic energy emitter according to claim 1, said nuclear fuel material being formed as a tightly packed group of spherical elements and being embedded in said emitter body.

References Cited

UNITED STATES PATENTS

| | | | |
|---|---|---|---|
| 3,054,914 | 9/1962 | Hatsopoulos | 310—4 |
| 3,113,091 | 12/1963 | Rasor | 310—4 |
| 3,121,048 | 2/1964 | Haas | 252—301.1 |
| 3,189,765 | 6/1965 | Danko | 310—4 |
| 3,201,619 | 8/1965 | Gleasop | 310—4 |
| 3,232,717 | 2/1966 | Hill | 252—301.1 |
| 3,234,412 | 2/1966 | Sankovich | 310—4 |
| 3,243,292 | 3/1966 | Hill | 75—208 |
| 3,281,372 | 10/1966 | Haas | 252—301.1 |

CARL D. QUARFORTH, Primary Examiner.

BENJAMIN R. PADGETT, Examiner.

A. J. STEINER, Assistant Examiner.